(12) United States Patent
Negishi et al.

(10) Patent No.: US 10,750,233 B2
(45) Date of Patent: Aug. 18, 2020

(54) RECORDING APPARATUS, RECORDING METHOD, AND PROGRAM

(71) Applicant: Sony Corporation, Tokyo (JP)

(72) Inventors: Shinji Negishi, Kanagawa (JP);
Michito Ishii, Kanagawa (JP);
Kazuhiro Ishigaya, Kanagawa (JP);
Takehito Watanabe, Tokyo (JP);
Noriaki Ooishi, Kanagawa (JP);
Yasuyuki Chaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 41 days.

(21) Appl. No.: 15/748,292

(22) PCT Filed: Aug. 12, 2016

(86) PCT No.: PCT/JP2016/073711
§ 371 (c)(1),
(2) Date: Jan. 29, 2018

(87) PCT Pub. No.: WO2017/033764
PCT Pub. Date: Mar. 2, 2017

(65) Prior Publication Data
US 2018/0220182 A1 Aug. 2, 2018

(30) Foreign Application Priority Data
Aug. 26, 2015 (JP) ................. 2015-166459

(51) Int. Cl.
*H04N 21/435* (2011.01)
*H04N 5/91* (2006.01)
(Continued)

(52) U.S. Cl.
CPC .......... *H04N 21/435* (2013.01); *G11B 20/10* (2013.01); *G11B 20/10527* (2013.01);
(Continued)

(58) Field of Classification Search
CPC ........ H04N 21/435; H04N 5/76; G11B 20/10; G11B 20/10527; G11B 20/12; G11B 20/1217
See application file for complete search history.

(56) References Cited

U.S. PATENT DOCUMENTS 6,850,696 B1 * 2/2005 Van Gestel .......... G11B 27/034
386/241
2004/0208135 A1 * 10/2004 Nakamura ............. G11B 20/10
370/265

(Continued)

FOREIGN PATENT DOCUMENTS

JP 2001-285234 A 10/2001
JP 2002-141917 A 5/2002

(Continued)

*Primary Examiner* — Thai Q Tran
*Assistant Examiner* — Sunghyoun Park
(74) *Attorney, Agent, or Firm* — Michael Best & Friedrich LLP

(57) ABSTRACT

The present technology relates to a recording apparatus, a recording method, and a program capable of avoiding a buffer overflow at the time of reproduction.
Each packet is separated from a packet string, and information indicating an arrival timing of each packet is output. The packet is divided into divided packets having a size which does not cause a buffer overflow, and a packet arrival time of each divided packet is embedded in a header of the divided packet. The present technology is applied to the recording apparatus.

14 Claims, 12 Drawing Sheets

(51) Int. Cl.
*H04N 21/433* (2011.01)
*G11B 20/10* (2006.01)
*H04N 9/877* (2006.01)
*H04N 5/76* (2006.01)
*G11B 20/12* (2006.01)
*H04N 21/236* (2011.01)

(52) U.S. Cl.
CPC .......... *G11B 20/12* (2013.01); *G11B 20/1217* (2013.01); *H04N 5/76* (2013.01); *H04N 5/91* (2013.01); *H04N 9/877* (2013.01); *H04N 21/433* (2013.01); *H04N 21/4334* (2013.01); *G11B 2020/1062* (2013.01); *G11B 2020/10805* (2013.01); *H04N 21/236* (2013.01)

(56) References Cited

U.S. PATENT DOCUMENTS

| | | | | |
|---|---|---|---|---|
| 2005/0069289 | A1* | 3/2005 | Kusunoki | G11B 27/034 386/232 |
| 2007/0274679 | A1* | 11/2007 | Yahata | G11B 20/1217 386/241 |
| 2008/0002946 | A1* | 1/2008 | Ikeda | G11B 20/10 386/332 |
| 2008/0137661 | A1* | 6/2008 | Kwon | H04L 47/10 370/394 |
| 2009/0129738 | A1* | 5/2009 | Morimoto | G11B 27/034 386/248 |
| 2010/0158015 | A1* | 6/2010 | Wu | H04L 49/90 370/395.7 |
| 2011/0296275 | A1* | 12/2011 | Kishigami | H04L 1/0003 714/755 |
| 2013/0173826 | A1* | 7/2013 | Kim | H04L 65/10 709/248 |

FOREIGN PATENT DOCUMENTS

| | | |
|---|---|---|
| JP | 2006-025372 A | 1/2006 |
| JP | 2010-035198 A | 2/2010 |
| JP | 4973773 A | 7/2012 |
| JP | 2015-023574 A | 2/2015 |
| JP | 2015-149680 A | 8/2015 |
| WO | 2005/099258 A1 | 10/2005 |

\* cited by examiner

RECORDING APPARATUS, RECORDING METHOD, AND PROGRAM

TECHNICAL FIELD

The present technology relates to a recording apparatus, a recording method, and a program, and particularly, to a recording apparatus, a recording method, and a program capable of avoiding a buffer overflow when packet data is reproduced.

BACKGROUND ART

A moving picture experts group (MPEG)-2 transport stream (TS) prescribed in ISO 13818-1 is used as a packet data structure for satellite digital broadcasting, digital terrestrial broadcasting, and the like.

In a MPEG-2 TS packet data string, data including audio and video of at least one or more programs is multiplexed in time division.

A packet of the MPEG-2 TS has a fixed length of 188 bytes.

In a case where the received packet data string is recorded, even when the recorded packet data string is read and reproduced, it is desirable that the data can be reproduced by an apparatus similar to that for receiving, decoding, viewing, and listening.

Therefore, a technology for applying a packet reception time to each packet and recording the time is used (refer to Patent Document 1).

With such a technology, when the recorded packet data string is read, by starting to read the packet at the timing of the reception time, reading of the packet head can be started at a timing similar to the timing in a case where the packet is received, viewed, and listened.

CITATION LIST

Patent Document

Patent Document 1: Japanese Patent No. 4973773 (Japanese Patent Application Laid-Open No. 2011-028841)

SUMMARY OF THE INVENTION

Problems to Be Solved By the Invention

Generally, data reading at the time of reproduction is performed at a speed faster than a data input rate at the time of receiving, viewing, and listening to the data. Therefore, there has been a risk that a buffer overflow occurs when a buffer data size is same as that at the time of receiving, viewing, and listening to the data.

Since the MPEG-2 TS packet has a relatively small fixed length of 188 bytes, the overflow can be avoided by a small additional buffer of 188 bytes.

However, in a case of a packet data structure having a relatively large or variable packet size, the overflow cannot be avoided unless an additional buffer for the maximum packet size is provided.

The present technology has been made in view of such a situation, and in particular, the present technology can avoid a buffer overflow at the time of reproduction.

Solutions to Problems

A recording apparatus according to one aspect of the present technology includes: a multiplexing/separating unit which separates each packet from a packet string; a packet dividing unit which divides the packet into divided packets having a predetermined size; a packet arrival time generating unit which generates a packet arrival time of each divided packet; and a packet arrival time applying unit which embeds the packet arrival time generated by the time generating unit in a header of the divided packet.

A recording unit which records the divided packet in which the packet arrival time is embedded in the header to a recording medium can be further included. The predetermined size can correspond to a size of an additional buffer which is added to be a data buffer size same as that at the time of receiving, viewing, and listening by a reproducing apparatus, for reproducing the divided packet recorded to the recording medium, to avoid the buffer overflow.

When a reading maximum rate at the time when the reproducing apparatus reproduces the divided packet is Rp and a reading maximum rate at the time when the divided packet is recorded is Rr, the predetermined size can be $((Rp/Rp-Rr) \times (\text{size of buffer}))$.

The multiplexing/separating unit can separate each packet from the packet string and output information indicating an arrival timing of each packet, the packet arrival time generating unit can generate the packet arrival time for each packet before the divided packet is divided on the basis of the information indicating the arrival timing of each packet. Relative to a divided packet which is a head packet of the divided packets, the packet arrival time of the packet before the divided packet is divided can be embedded in the header as it is, and relative to a second and subsequent divided packets of the divided packets, a packet arrival time corresponding time sequentially calculated from the packet arrival time of the packet before the divided packet is divided on the basis of the sizes of the divided packets and an input rate at the time of recording can be embedded in the header as the packet arrival time.

The packet arrival time applying unit can set an extra header for each divided packet and embed an arrival time stamp (ATS) in the extra header as the packet arrival time generated by the time generating unit.

In a case of MPEG Media Transport (MMT), the packet arrival time applying unit can embed the packet arrival time generated by the time generating unit in a header including a MMTP packet header of each divided packet in a network time protocol (NTP) format.

A simulating unit can be further included which simulates an operation of a reproducing apparatus which includes a buffer for sequentially buffering the divided packets recorded to the recording medium as necessary and a decoding unit for sequentially decoding a divided packet string buffered by the buffer and instructs the buffer dividing unit to divide the packet into the divided packets in a case where a buffer overflow occurs in the simulation. The buffer dividing unit can divide the packet into the divided packets only in a case where the simulating unit instructs the buffer dividing unit to divide the packet into the divided packets.

The simulating unit can instruct to divide the packet into the divided packets having the maximum packet length which does not cause the buffer overflow from the simulation result in a case where the buffer overflow occurs in the simulation, and the buffer dividing unit can divide the packet into the divided packets having the maximum packet length which does not cause the buffer overflow.

A recording method according to one aspect of the present technology is a recording method including: separating each packet from a packet string; dividing the packet into divided packets having a predetermined size; generating a packet arrival time for each divided packet; and embedding the generated packet arrival time in a header of the divided packet.

A program according to one aspect of the present technology causes a computer to function as: a multiplexing/separating unit which separates each packet from a packet string; a packet dividing unit which divides the packet into divided packets having a predetermined size; a packet arrival time generating unit which generates a packet arrival time of each divided packet; and a packet arrival time applying unit which embeds the packet arrival time generated by the time generating unit in a header of the divided packet.

In one aspect of the present technology, each packet is separated from a packet string, the packet is divided into divided packets having a predetermined size, a packet arrival time is generated for each divided packet, and the generated packet arrival time is embedded in a header of the divided packet.

The recording apparatus according to one aspect of the present technology may be an independent apparatus and may be a block functioning as the recording apparatus.

Effects of the Invention

According to one aspect of the present technology, it is possible to avoid a buffer overflow at the time of reproduction.

MODE FOR CARRYING OUT THE INVENTION

First Embodiment

<Exemplary Configuration of Conventional Recording Apparatus>

Figure 1:
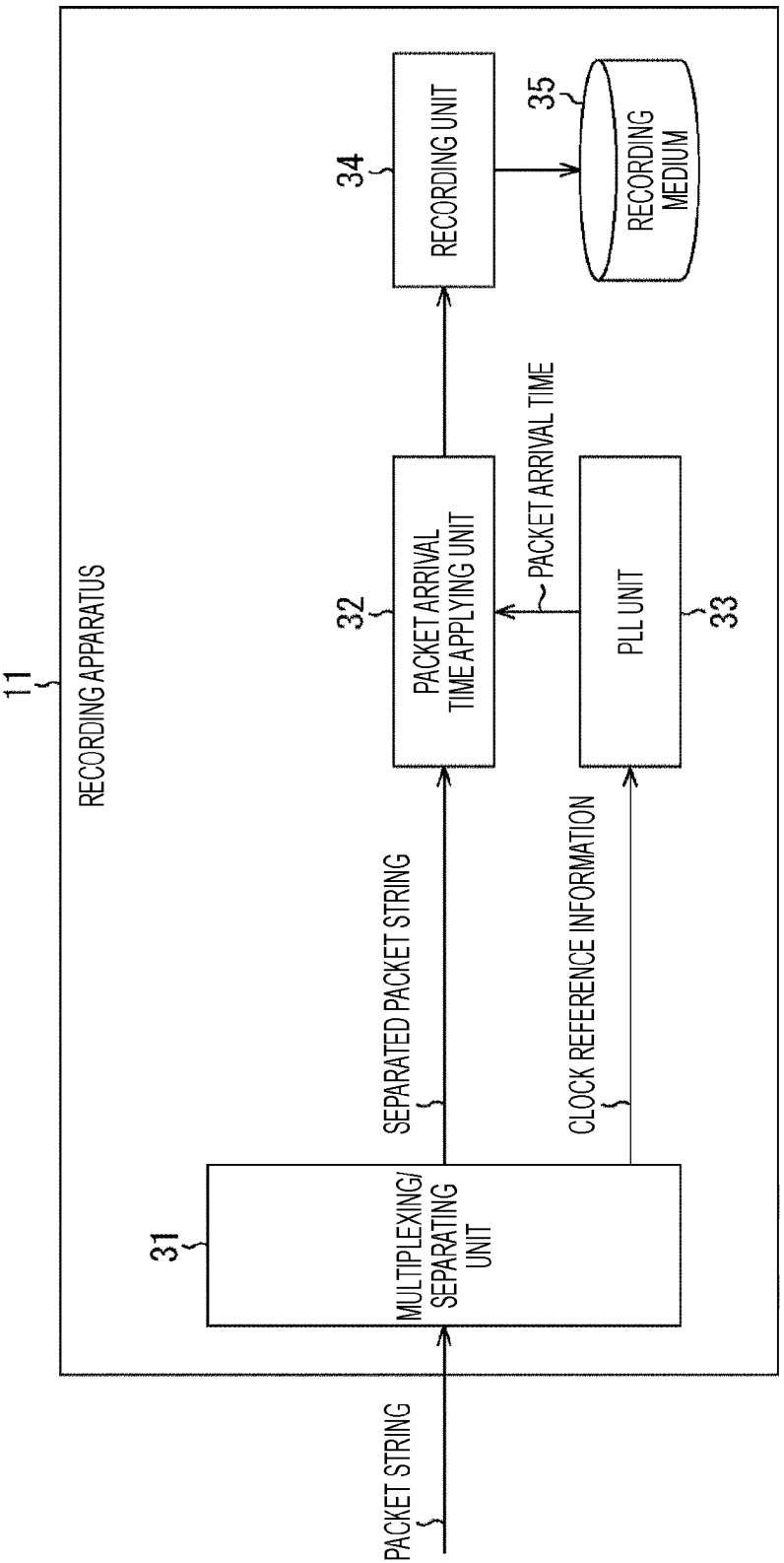
FIG. 1 is a diagram describing an exemplary configuration of a conventional recording apparatus.

A configuration of a conventional recording apparatus is described first when starting to describe a recording apparatus to which the present technology has been applied.

A conventional recording apparatus 11 includes a multiplexing/separating unit 31, a packet arrival time applying unit 32, a PLL unit 33, a recording unit 34, and a recording medium 35.

The multiplexing/separating unit 31 sequentially separates each packet from a packet string, as an input packet string, including moving picture experts group (MPEG)-2 transport stream (TS) packets and the like transmitted, for example, as digital broadcasting signals and supplies the separated packets to the packet arrival time applying unit 32. Furthermore, the multiplexing/separating unit 31 supplies clock reference information to restore clock signals of the transmission side to the PLL unit 33.

In a case of the MPEG-2 TS packet, a program clock reference (PCR) is used as the clock reference information. Furthermore, in a case of ARIB-STD-B60 which is a standard using MPEG media transport (MMT) prescribed in Part 1 of the MPEG-H standard, the network time protocol (NTP) is used as the clock reference information.

The phase locked loop (PLL) unit 33 restores a transmission-side clock by using the clock reference information, generates a packet arrival time to be updated while being counted in synchronization with the restored clock, and supplies the generated packet arrival time to the packet arrival time applying unit 32.

The packet arrival time applying unit 32 applies the packet arrival time to a packet, which has been multiplexed and separated, to be recorded and supplies the packet to the recording unit 34.

The recording unit 34 records and stores the packet to which the packet arrival time has been applied to the recording medium 35.

<Recording Processing by Conventional Recording Apparatus>

Figure 2:
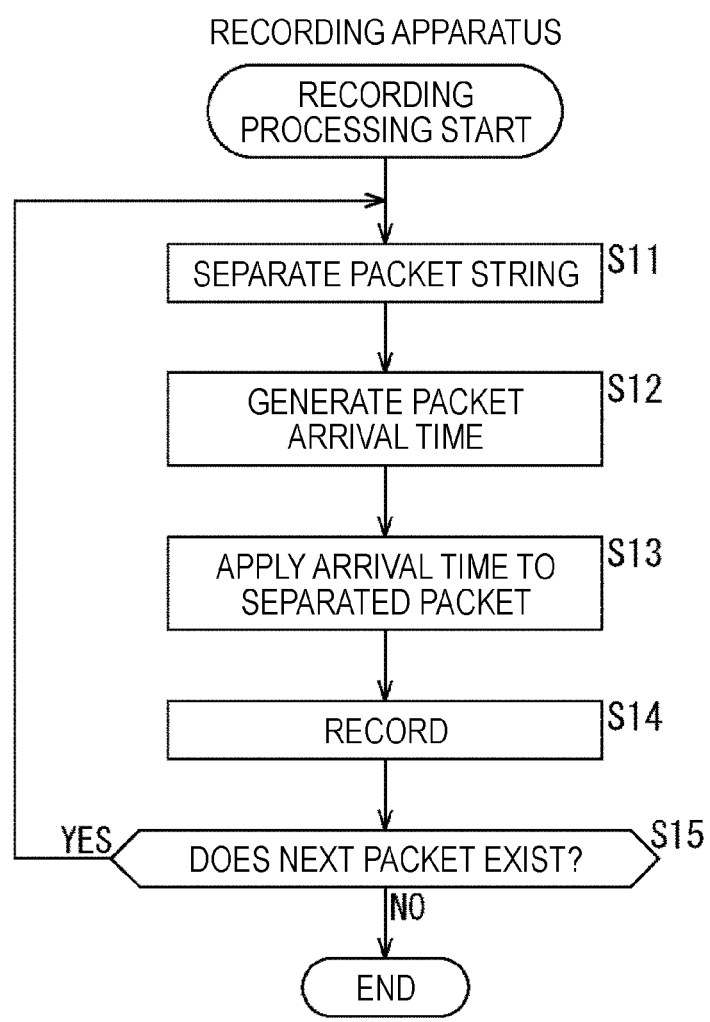
FIG. 2 is a flowchart describing recording processing by the recording apparatus in FIG. 1.

Next, recording processing by the conventional recording apparatus 11 in FIG. 1 is described with reference to the flowchart in FIG. 2.

In step S11, the multiplexing/separating unit 31 supplies the packet string including the MPEG-2 TS packets and the like transmitted, for example, as digital broadcasting signals, as an input packet string to the packet arrival time applying unit 32 by sequentially separating each packet from the packet string. Furthermore, the multiplexing/separating unit 31 supplies the clock reference information to restore the transmission-side clock signals to the PLL unit 33.

In step S12, the phase locked loop (PLL) unit 33 restores the transmission-side clock by using the clock reference information, generates a packet arrival time to be updated while being counted in synchronization with the restored clock, and supplies the generated packet arrival time to the packet arrival time applying unit 32.

In step S13, the packet arrival time applying unit 32 applies the packet arrival time to the packet, which is multiplexed and separated, to be recorded by embedding the arrival time in a header and supplies the packet to the recording unit 34.

In step S14, the recording unit 34 records and stores the packet, to which the header having the packet arrival time embedded therein is applied, to the recording medium 35.

In step S15, the multiplexing/separating unit 31 determines whether the next packet is supplied. In a case where the next packet is supplied, the procedure returns to step S11, and subsequent processing is repeated. Then, in a case where it has been determined in step S15 that no packet is supplied, the procedure is terminated.

Figure 3:
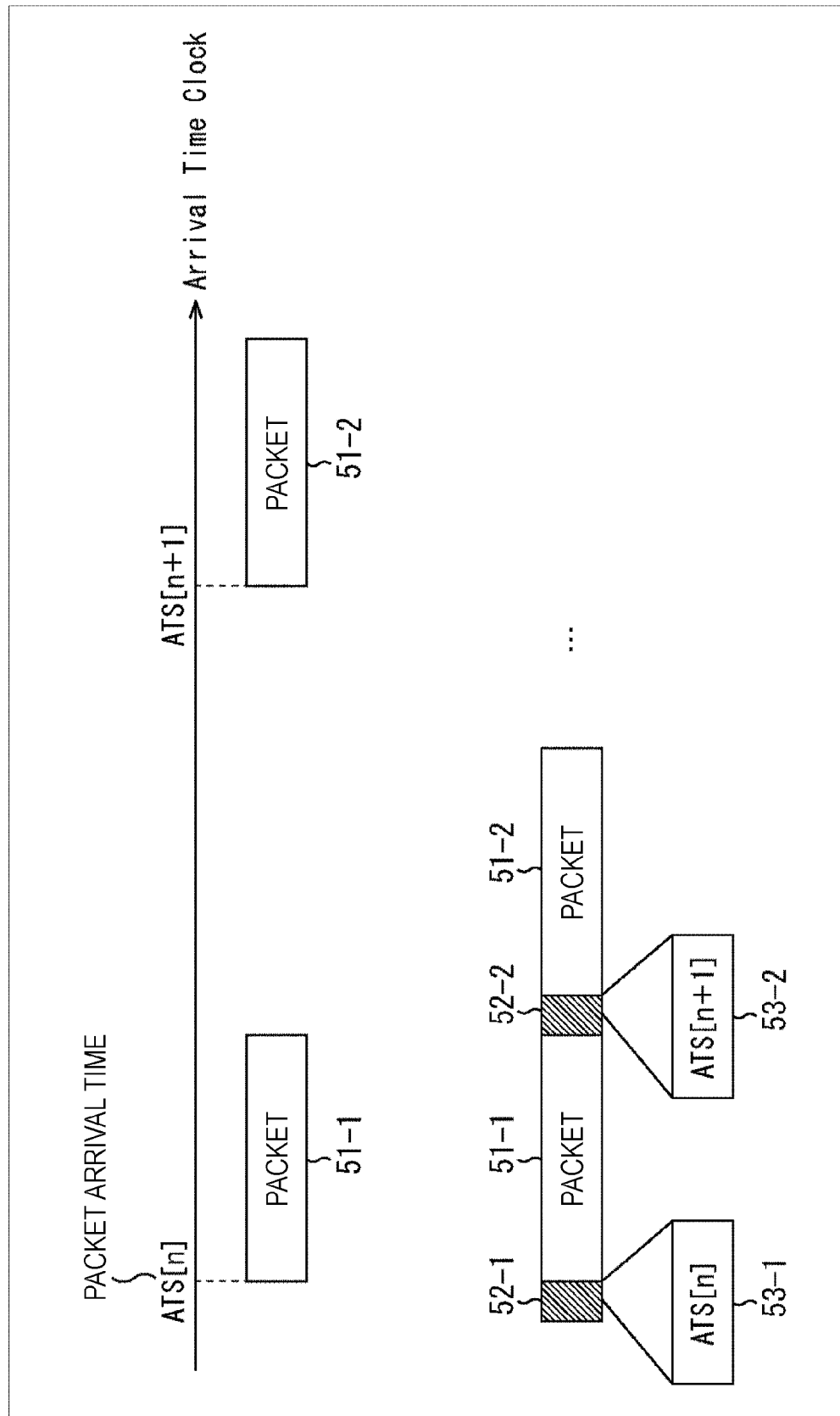
FIG. 3 is a time chart describing the recording processing by the recording apparatus in FIG. 1.

That is, according to the above processing, in a case of the MPEG-2 TS packet, for example, when a packet 51-1 is supplied at a packet arrival time ATS [n] as illustrated in the upper part of FIG. 3, an extra header (Extra_Header) 52-1 including a packet arrival time ATS [n] 53-1 is applied to the head of the packet 51-1 as illustrated in the lower part of FIG. 3.

Then, similarly to the above, in the following processing, for example, when a packet 51-2 is supplied at a packet arrival time ATS [n+1] as illustrated in the upper part of FIG. 3, an extra header (Extra_Header) 52-2 including a packet arrival time ATS [n+1] 53-2 is applied to the head of the packet 51-2 as illustrated in the lower part of FIG. 3.

In this way, the extra header 52 including the packet arrival time 53 is sequentially applied to the head of each packet 51 in the packet string, and the extra header 52 is sequentially recorded to the recording medium 35.

Note that, in FIG. 3, an example is illustrated in a case of an MPEG-2 TS packet including a syntax which does not include packet arrival time information in a packet header. That is, in a case of the MPEG-2 TS packet, it is necessary to separately provide an additional header to embed the packet arrival time therein. Therefore, in a case of the MPEG-2 TS packet, an extra header (Extra_Header) is especially provided at the head of the packet, and the packet arrival time is embedded in the extra header.

On the other hand, as a MPEG media transport (MMT) packet or the like, in a case where time information corresponding to the packet arrival time has been previously included as the syntax of each packet header (header having the name of MMTP packet header has been previously provided), the packet arrival time may be embedded in the header which has been previously provided.

<Exemplary Configuration of Reproducing Apparatus>

Next, an exemplary configuration of a general reproducing apparatus is described with reference to FIG. 4.

Figure 4:
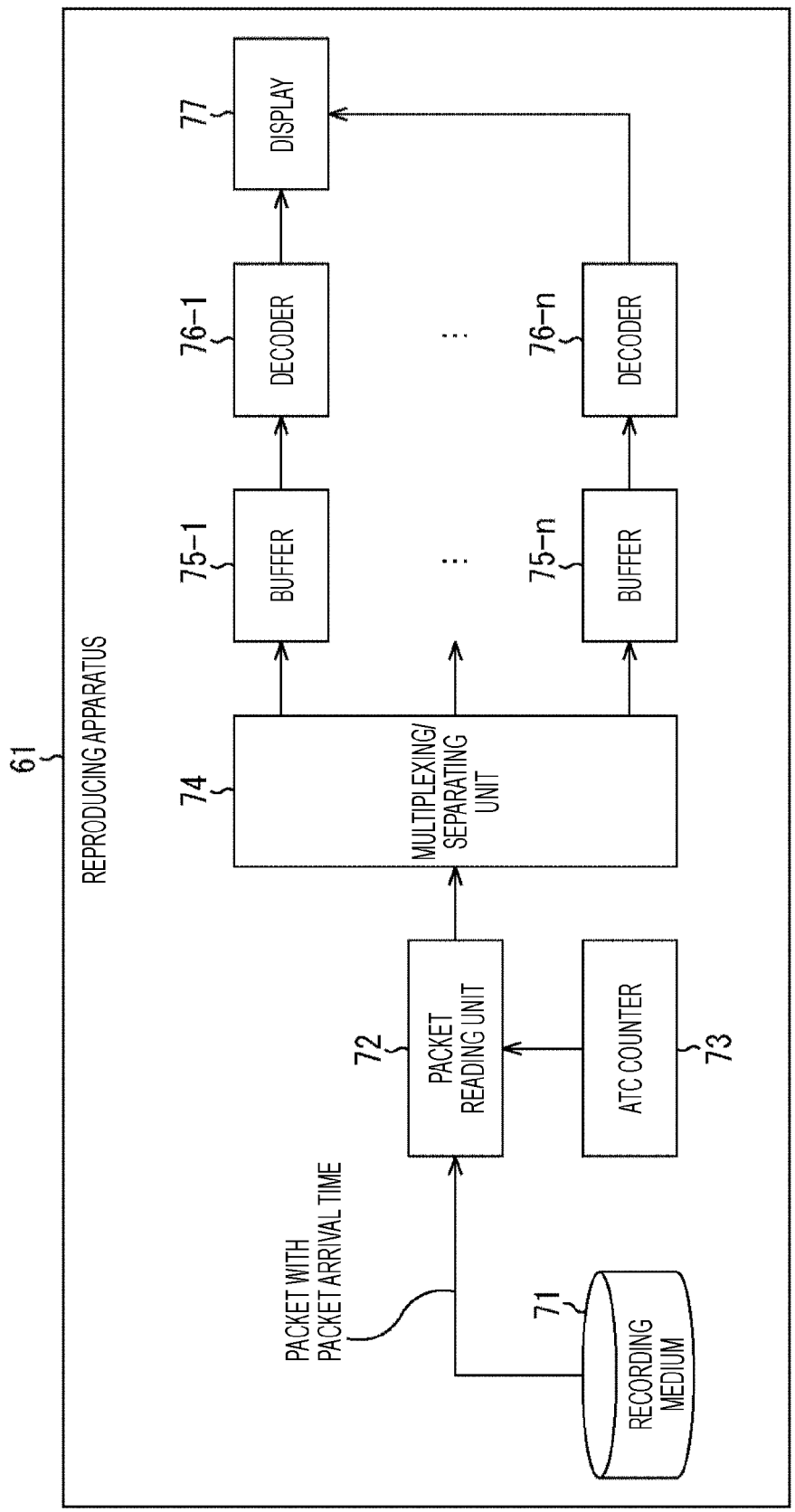
FIG. 4 is a diagram describing an exemplary configuration of a general reproducing apparatus.

A reproducing apparatus 61 in FIG. 4 includes a recording medium 71, a packet reading unit 72, an ATC counter 73, a multiplexing/separating unit 74, buffers 75-1 to 75-n, decoders 76-1 to 76-n, and a display 77. Note that, in the following description, the buffers 75-1 to 75-n and the decoders 76-1 to 76-n are simply referred to as a buffer 75 and a decoder 76 unless it is necessary to distinguish them separately, and other components are similarly referred.

The recording medium 71 corresponds to the recording medium 35 in FIG. 1 and stores the packets to which the header (extra header in a case of MPEG-2 TS packet) where the packet arrival time is embedded is applied. The packets are sequentially read by the packet reading unit 72.

The packet reading unit 72 sequentially reads the packets to which the headers recorded in the recording medium 71 have been applied and outputs the packet to the multiplexing/separating unit 74 at the timing corresponding to the packet arrival time embedded in the header on the basis of the arrival time information supplied from the arrival time clock (ATC) counter 73. That is, the packets are sequentially supplied to the multiplexing/separating unit 74 on the basis of the information of the ATC counter 73 and the information on the packet arrival time. Therefore, the packets are supplied to the multiplexing/separating unit 74 so that the timing between the packets coincides with a time interval between the packets in the packet string supplied at the time of recording.

The multiplexing/separating unit 74 separates information in packet units which is supplied from the packet reading unit 72 in channel units, and makes any one of the buffers 75-1 to 75-n buffer the separated information.

The decoders 76-1 to 76-n read and decode the packet string buffered by each of the buffers 75-1 to 75-n in channel units by a predetermined data strength, and display the decoded result on the display 77, for example, including a liquid crystal display (LCD) and the like. Furthermore, the data to be reproduced includes image data and audio data. Here, to display the data on the display 77 means to display an image and output audio from a speaker (not shown) or the like.

<Reproducing Processing by Reproducing Apparatus in FIG. 4>

Figure 5:
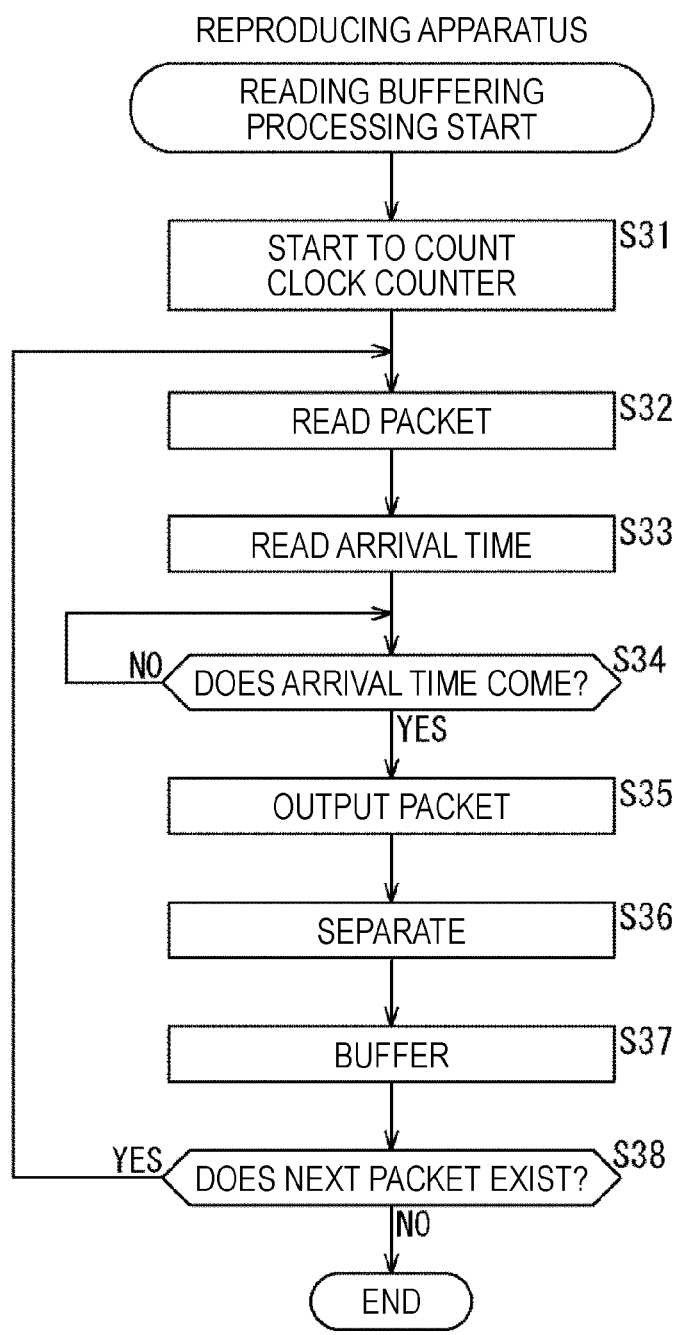
FIG. 5 is a flowchart describing reproducing processing by the reproducing apparatus in FIG. 4.

Next, reading buffering processing which is processing from reading the packet by the reproducing apparatus in FIG. 4 to buffering is described with reference to the flowchart in FIG. 5.

In step S31, the ATC counter 73 sequentially starts to count a clock counter corresponding to the time and sequentially outputs the counted value to the packet reading unit 72.

In step S32, the packet reading unit 72 sequentially reads a packet including a header from the recording medium 71.

In step S33, the packet reading unit 72 reads information on the packet arrival time embedded in the header of the read packet.

In step S34, the packet reading unit 72 determines whether it is the timing corresponding to the packet arrival time on the basis of the value of the clock counter supplied from the ATC counter 73, and the packet reading unit 72 repeats similar processing until the timing is assumed to correspond to the packet arrival time. Then, in a case where it has been determined in step S34 that the value of the counter supplied from the ATC counter 73 is the timing corresponding to the packet arrival time, the procedure proceeds to step S35.

In step S35, the packet reading unit 72 outputs the read packet to the multiplexing/separating unit 74.

In step S36, the multiplexing/separating unit 74 separates the supplied packet in channel units.

In step S37, the multiplexing/separating unit 74 makes the buffer 75 of the corresponding channel store (buffer) the separated packet.

In step S38, the packet reading unit 72 determines whether the next packet exists. In a case where the next packet exists, the procedure returns to step S32, and subsequent processing is repeated.

Then, in a case where it has been determined in step S38 that no next packet exists, the procedure is terminated. At this time, the ATC counter 73 stops counting.

Through the series of processing described above, the reproducing apparatus 61 sequentially reproduces the packet string recorded by the recording apparatus 11 by the predetermined data length.

Note that, it is not necessary to read the entire packet in step S32, and it is preferable that the arrival time be read. Therefore, in a case where only the arrival time is read in step S32, the packet reading unit 72 reads the entire packet from the recording medium 71 and outputs the read packet to the multiplexing/separating unit 74 in step S35.

<Buffer Occupancy at the time of Reproduction>

Here, a transition of the buffer occupancy in the buffer 75 at the time of the reproduction is described with reference to FIG. 6.

Generally, data reading at the time of reproduction is performed at a speed faster than a data input rate at the time of receiving, viewing, and listening. Therefore, a buffer overflow may occur if the buffer size is same as that at the time of receiving, viewing, and listening.

That is, the reading rate at the time of reproduction is higher than the input rate at the time of recording. Therefore, if the timing to read the head of the packet 51-1 is adjusted to a time t11 corresponding to the packet arrival time ATS [n], the packet 51-1 is read at the similar speed to the time of recording as illustrated in the upper part of FIG. 6. If it is assumed that the reading be completed at a time t13, normally, a time required to read the packet at the time of reproduction is shorter. For example, as indicated by a packet 91-1 illustrated in the middle part of FIG. 6, the reading is completed at a time t12. Therefore, as illustrated in the lower part of FIG. 6, the buffer occupancy in the buffer 75 is more rapidly increased as indicated by a dotted line than that at the time of recording which is indicated by a solid line.

Figure 6:
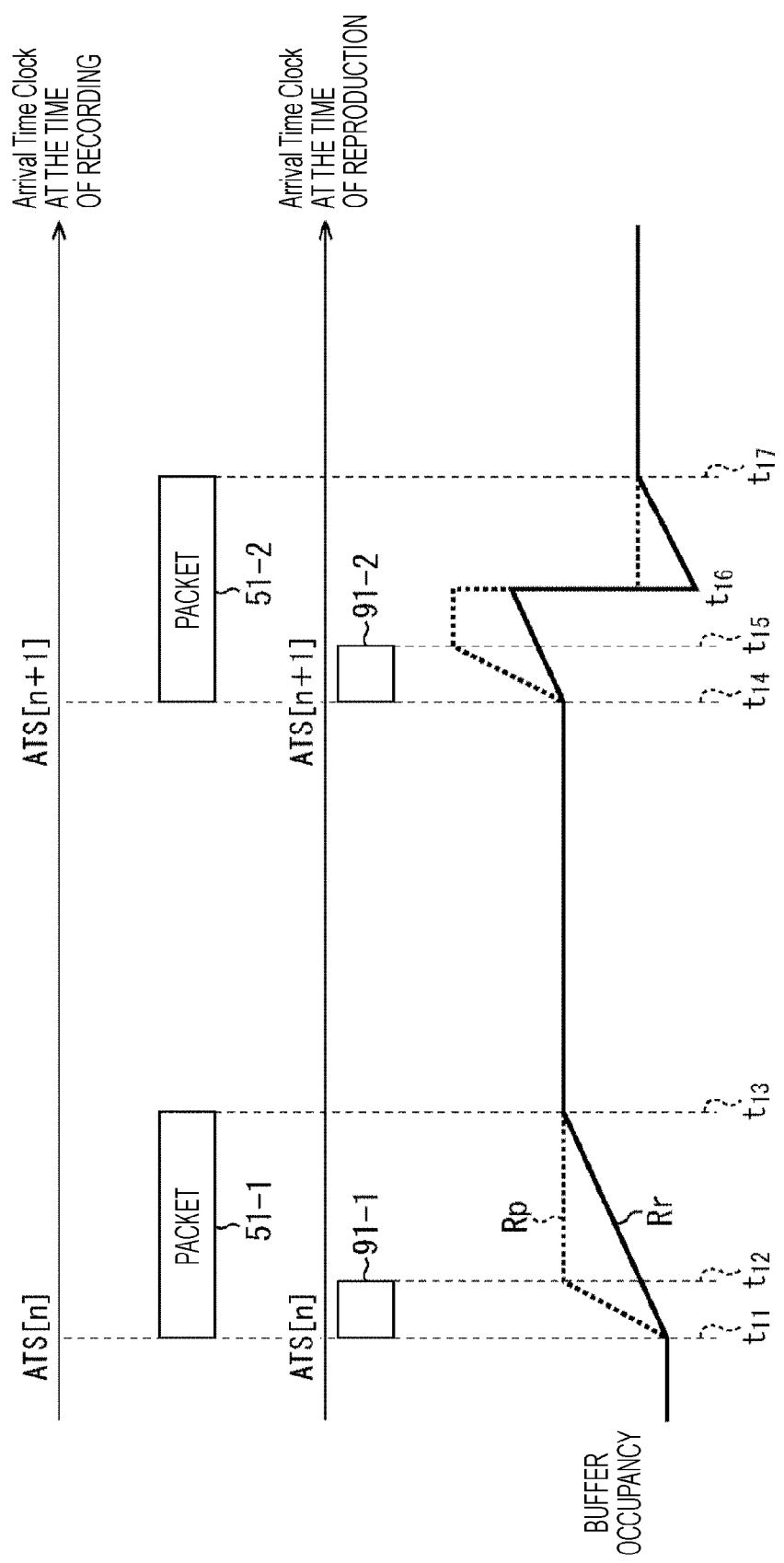
FIG. 6 is a time chart describing packet read timings in the recording processing by the recording apparatus in FIG. 1 and in the reproducing processing by the reproducing apparatus in FIG. 4.

In addition, if the next packet 51-2 is read at a time t14 corresponding to the packet arrival time ATS [n+1] and reading is completed at a time t17 as illustrated in the upper part of FIG. 6, normally, a time required to read the packet at the time of reproduction is shorter. For example, as indicated by a packet 91-2 illustrated in the middle part of FIG. 6, the reading is completed at a time t15. Therefore, as illustrated in the lower part of FIG. 6, the buffer occupancy in the buffer 75 is more rapidly increased as indicated by the dotted line than that at the time of recording which is indicated by the solid line.

Here, in a case where it is assumed that the data be extracted from the buffer 75 by the decoder 76 and be decoded at a time t16, the buffer occupancy in the buffer 75 at the timing from the time t15 to the time t16 is extremely increased, and the buffer overflow may occur.

However, since the MPEG-2 TS packet has a relatively small fixed length of 188 bytes, it is possible to avoid the overflow by adding a small additional buffer of 188 bytes to the buffer 75 in FIG. 4. Here, the additional buffer has a buffer size for avoiding the overflow which is added to be the data buffer size same as that at the time of receiving, viewing, and listening by the reproducing apparatus 61 and is added to the buffer 75.

However, in a case of a packet data structure having a relatively large or a variable packet size, there is a risk that the overflow cannot be avoided unless the large additional buffer for the maximum packet size is provided.

In the reproducing apparatus, the buffer 75 is physically and individually provided for each data type such as video and audio, and it is necessary to provide the large additional buffer having the maximum packet size relative to each buffer 75 for each data type (capacity of buffer 75 needs to be larger). Therefore, the cost may increase.

<Exemplary Configuration of Recording Apparatus to Which Present Technology Has Been Applied>

Therefore, in the recording apparatus to which the present technology has been applied, the buffer overflow is avoided by dividing the size of the packet into a predetermined size of the packet and recording the packets.

Figure 7:
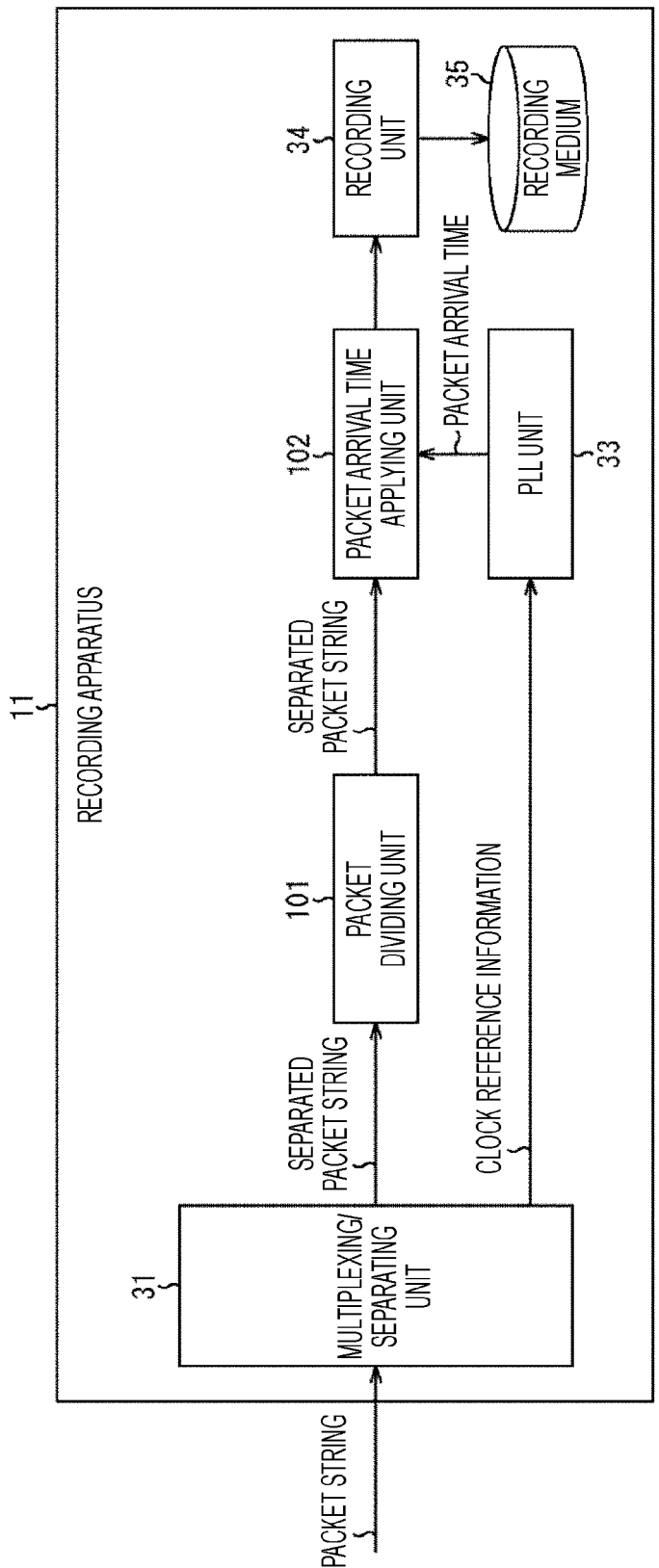
FIG. 7 is a diagram describing an exemplary configuration of a first embodiment of a recording apparatus to which the present technology has been applied.

Note that, in FIG. 7, an exemplary configuration of a first embodiment of the recording apparatus to which the present technology has been applied is illustrated. Components of the recording apparatus 11 in FIG. 7 having same functions as those in the recording apparatus 11 in FIG. 1 are denoted with the same reference numerals and have the same names, and the description regarding them is appropriately omitted.

That is, the recording apparatus 11 in FIG. 7 is different from that in FIG. 1 in that a packet arrival time applying unit 102 is provided instead of the packet arrival time applying unit 32, and in addition, a packet dividing unit 101 is newly provided.

The packet dividing unit 101 divides the separated packet supplied from the multiplexing/separating unit 31 into predetermined sizes capable of avoiding the buffer overflow. Then, the packet dividing unit 101 supplies the packet to the packet arrival time applying unit 32 as the divided packet.

Here, the predetermined size capable of avoiding the buffer overflow can be regarded as the maximum packet length necessary for avoiding the buffer overflow. Therefore, for example, the predetermined size may be the size of the additional buffer of the buffer 75 included in the reproducing apparatus 61.

Furthermore, the predetermined size of the packet to be divided, which corresponds to the size of the additional buffer of the buffer 75 included in the reproducing apparatus 61, capable of avoiding the buffer overflow may be a value calculated by the following formula (1) by using a rate corresponding to an inclination of a graph indicating the change in the buffer occupancy in FIG. 6.

The predetermined size of the packet to be divided $$\text{(packet maximum length)} = (Rp/(Rp-Rr)) \times \text{(size of buffer 75)} \quad (1)$$

Here, Rp represents a reading maximum rate at the time of reproduction (inclination of dotted line portion in lower part of FIG. 6) as indicated by the dotted line in the lower part of FIG. 6, and Rr represents an input rate at the time of recording (inclination of solid line portion in lower part of FIG. 6) as indicated by the solid line in the lower part of FIG. 6.

With this setting, it is possible to prevent occurrence of the buffer overflow by dividing the packet into the packets having an appropriate size.

In addition, the packet arrival time applying unit 102 applies a header in which the packet arrival time is embedded or a header in which the packet arrival time corresponding time corresponding to the packet arrival time is embedded as the packet arrival time to the divided packet.

<Recording Processing by Recording Apparatus in FIG. 7>

Figure 8:
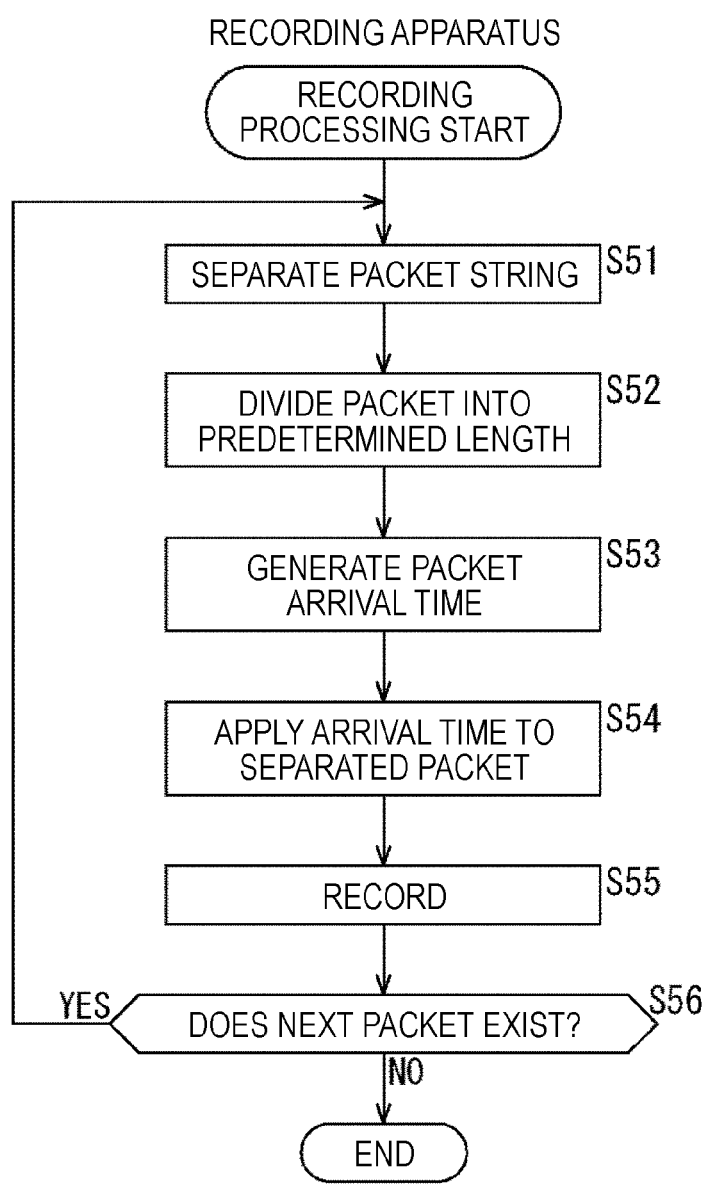
FIG. 8 is a flowchart describing recording processing by the recording apparatus in FIG. 7.

Next, recording processing by the recording apparatus in FIG. 7 is described with reference to the flowchart in FIG. 8. Note that, since the processing in steps S51, S55, and S56 in the flowchart in FIG. 8 is similar to the processing in steps S11, S14, and S15 in the flowchart in FIG. 2, the description thereof is omitted.

That is, in step S51, if the packet string is separated by the multiplexing/separating unit 31 in packet units, the packet dividing unit 101 divides the packet into predetermined lengths in size in step S52, and supplies the divided packet to the packet arrival time applying unit 102.

In step S53, the PLL unit 33 generates the packet arrival time on the basis of the clock reference information and supplies the packet arrival time to the packet arrival time applying unit 102.

In step S54, the packet arrival time applying unit 102 embeds and applies the packet arrival time supplied from the PLL unit 33 in the header relative to the divided packet which is at the head of the divided packets with respect to the packet, which is not divided yet, and outputs the packet to the recording unit 34. In addition, the packet arrival time applying unit 102 calculates the packet arrival time corresponding time corresponding to the packet arrival time and embeds the calculated time in the header of the packet as the packet arrival time relative to the second and subsequent divided packets of the packet, which is not divided yet, of the divided packets and outputs the packets to the recording unit 34.

More specifically, in a case of the MPEG-2 TS packet, since the header in which the packet arrival time is embedded does not exist in the original syntax, the packet arrival time applying unit 102 sets the packet arrival time as an arrival time stamp (ATS) with an arrival time clock (ATC) as the reference of the packet arrival time and applies the extra header in which the information on the packet arrival time including the ATS is embedded to a head of a payload of each packet, and outputs the packet to the recording unit 34.

Therefore, regarding the packets divided to avoid the buffer overflow, relative to the head packet, a time of actual arrival before the division is applied as the packet arrival time, and the extra header in which the packet arrival time corresponding time corresponding to the packet arrival time calculated according to the packet length is embedded is applied to the subsequent divided packets.

Figure 9:
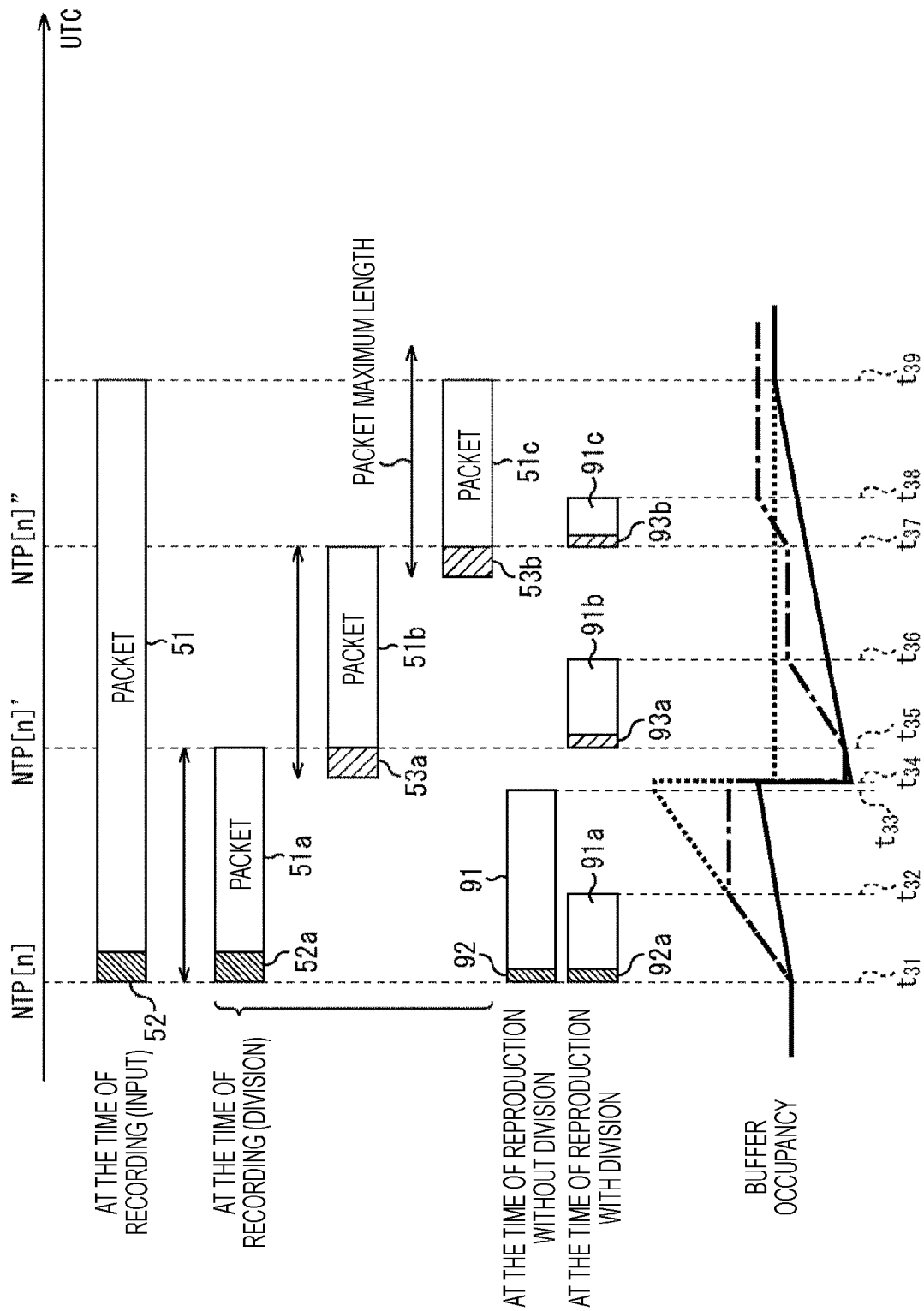
FIG. 9 is a time chart describing packet read timings in the recording processing by the recording apparatus in FIG. 7 and in the reproducing processing by the reproducing apparatus in FIG. 4.

On the other hand, in a case of the MPEG media transport (MMT) packet, since the reference of the packet arrival time is a universal time clock (UTC), the packet arrival time is received in a state where the packet arrival time is previously included in the header (MMTP packet header) 52 in a network time protocol (NTP) format as illustrated in the uppermost row of FIG. 9.

In such a case, when a packet which exceeds the packet maximum length necessary to avoid the buffer overflow relative to the size of the buffer 75 of the reproducing apparatus 61 is input, the packet dividing unit 101 divides the input packet. A case is illustrated in the second row from the top in FIG. 9 where the packet 51 is divided into three packets, i.e., packets 51a to 51c. Note that, a header 52a which is the same as the header 52 in which the packet arrival time is embedded is applied to the divided packet 51a. In addition, a header 53a in which a packet arrival time corresponding time calculated from the packet arrival time of the header 52 is embedded as the packet arrival time is applied to the divided packet 51b, and similarly, a header 53b in which a packet arrival time corresponding time calculated from the packet arrival time of the header 52 is embedded as the packet arrival time is applied to the packet 51c.

In a case where the packet 51 is divided into three, the packet arrival time applying unit 102 applies the header (MMTP packet header) 52 to the head packet 51a as the header 52a in which the original packet arrival time is embedded. Furthermore, the packet arrival time applying unit 102 applies the headers (MMTP packet header) 53a and 53b including the packet arrival time corresponding time NTP [n]' corresponding to the packet arrival time to the second and subsequent packets 51b and 51c and generates the divided packets (MMTP packet).

At this time, the packet arrival time applying unit 102 may receive the packet arrival times of the divided packets other than the head packet as the packet arrival time corresponding time of the head byte of the divided packet from the PLL unit 33 and embed the received time in the header and may calculate the packet arrival time corresponding time according to the packet length of the divided packet and embed the calculated time in the header.

In a case where the packet arrival time corresponding time is calculated according to the packet length of the divided packet, the packet arrival time applying unit 102 may calculate the time, for example, by using the following formula (2) on the basis of the input rate at the time of recording.

$$NTP\ [n]' = NTP\ [n] + (\text{size of packet } [n])/(\text{input rate at the time of recording}) \quad (2)$$

Here, NTP [n]' is a packet arrival time corresponding time of the packet [n]', and NTP [n] is a packet arrival time or a packet arrival time corresponding time of the packet [n] immediately before the packet [n]'.

Furthermore, in a case where the header is added by the division as illustrated in FIG. 9, and in a case where the header is input to the buffer at the time of reproduction, the packet dividing unit 101 calculates the packet maximum length by subtracting the total size of the header which may be stored in the buffer 75 from the size of the buffer 75.

In a case where the packet 51 is not divided, a payload 91 and a header 92, illustrated in the third row in FIG. 9, corresponding to the packet 51 are read. When the packet is buffered from a time t31, the buffer occupancy increases at a time t33 as indicated by a dotted line in a fifth row in FIG. 9. That is, if the buffer occupancy rapidly increases in this way, the buffer overflow may occur with high possibility.

However, as illustrated in the second row in FIG. 9, the packet 51 is divided into the three packets, i.e., the packets 51a to 51c so that processing is performed in three divided periods as indicated by the headers 52a, 53a, and 53b in the fourth row in FIG. 9.

As a result, regarding the processing on the head packet including a payload 91a and a header 92a corresponding to the packet 51a, as indicated by a dashed-dotted line in the fifth row in FIG. 9, when the buffering is started at the time t31, the buffer occupancy before the buffer overflow is maintained at and after a time t32, and the buffer occupancy is decreased when the decoding is started at a time t34.

After that, when the buffering of the second packet including a payload 91b and a header 93a corresponding to the packet 51b is started at a time t35 and ends at a time t36 as indicated in the fourth row in FIG. 9, as indicated by the dashed-dotted line in the fifth row in FIG. 9, the buffer occupancy is maintained from the time t36 to a time t37 in a state where the buffer overflow does not occur.

In addition, when the buffering of the third packet including a payload 91c and a header 93b corresponding to the packet 51c is started at a time t37 and ends at a time t38 as indicated in the fourth row in FIG. 9, as indicated by the dashed-dotted line in the fifth row in FIG. 9, the buffer occupancy is maintained from the time t38 to a time t39 in a state where the buffer overflow does not occur.

That is, by dividing the packet length in this way and delaying the transmission of the packets in stages, as indicated by the solid line in the fifth row in FIG. 9, a state close to a change in the buffer occupancy at the time of recording can be reproduced, and as a result, the buffer overflow can be avoided.

Second Embodiment

In the above, an example in which the packet is divided with the fixed packet maximum length has been described. However, only in a case where operations of the buffer 75 and the decoder 76 are simulated for each packet and a buffer overflow occurs, the packet may be divided.

Figure 10:
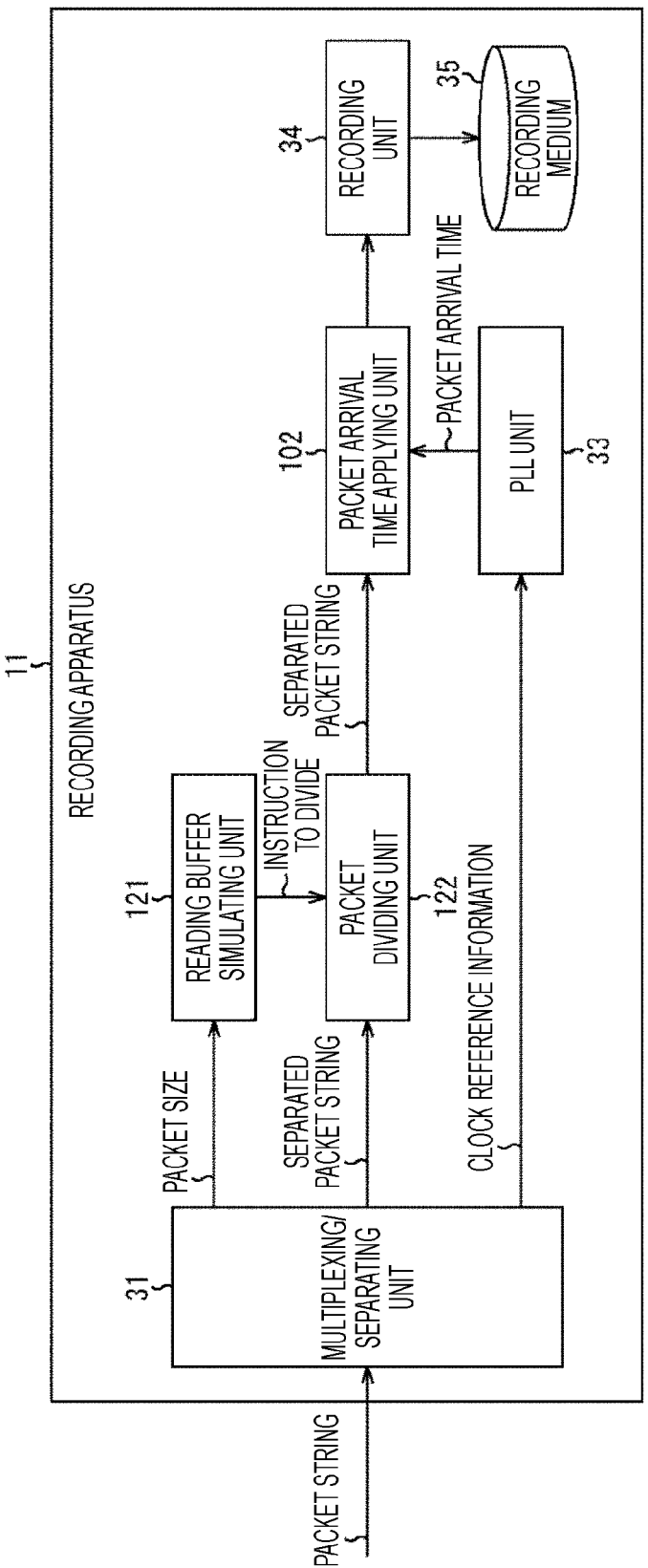
FIG. 10 is a diagram describing an exemplary configuration of a second embodiment of a recording apparatus to which the present technology has been applied.

In FIG. 10, an exemplary configuration of a recording apparatus 11 in which packets are divided only in a case where the buffer overflow occurs is illustrated. Note that, components having the same functions as those in the recording apparatus 11 in FIG. 7 are denoted with the same reference numerals and have the same names, and the description regarding them is appropriately omitted.

That is, the recording apparatus 11 in FIG. 10 is different from the recording apparatus 11 in FIG. 7 in that a reading buffer simulating unit 121 is newly provided, and in addition, a packet dividing unit 122 is provided instead of the packet dividing unit 101.

The reading buffer simulating unit 121 reproduces decoding processing in the buffer 75 and the decoder 76 by simulating the processing when a separated packet string is sequentially processed, and determines whether the buffer overflow occurs. Then, in a case where the buffer overflow occurs, the reading buffer simulating unit 121 calculates the maximum packet length which does not cause the buffer overflow and instructs the packet dividing unit 122 to divide the packet with the maximum packet length.

When the reading buffer simulating unit 121 does not instruct the packet dividing unit 122 to divide the packet, the packet dividing unit 122 outputs the separated packet, which has been supplied, to the packet arrival time applying unit 102 as it is. In a case where the reading buffer simulating unit 121 instructs the packet dividing unit 122 to divide the packet, the packet dividing unit 122 divides the separated packet with the maximum packet length supplied together with the instruction and outputs the divided packets to the packet arrival time applying unit 102.

<Recording Processing by Recording Apparatus in FIG. 10>

Next, recording processing by the recording apparatus in FIG. 10 is described with reference to the flowchart in FIG. 11.

Figure 11:
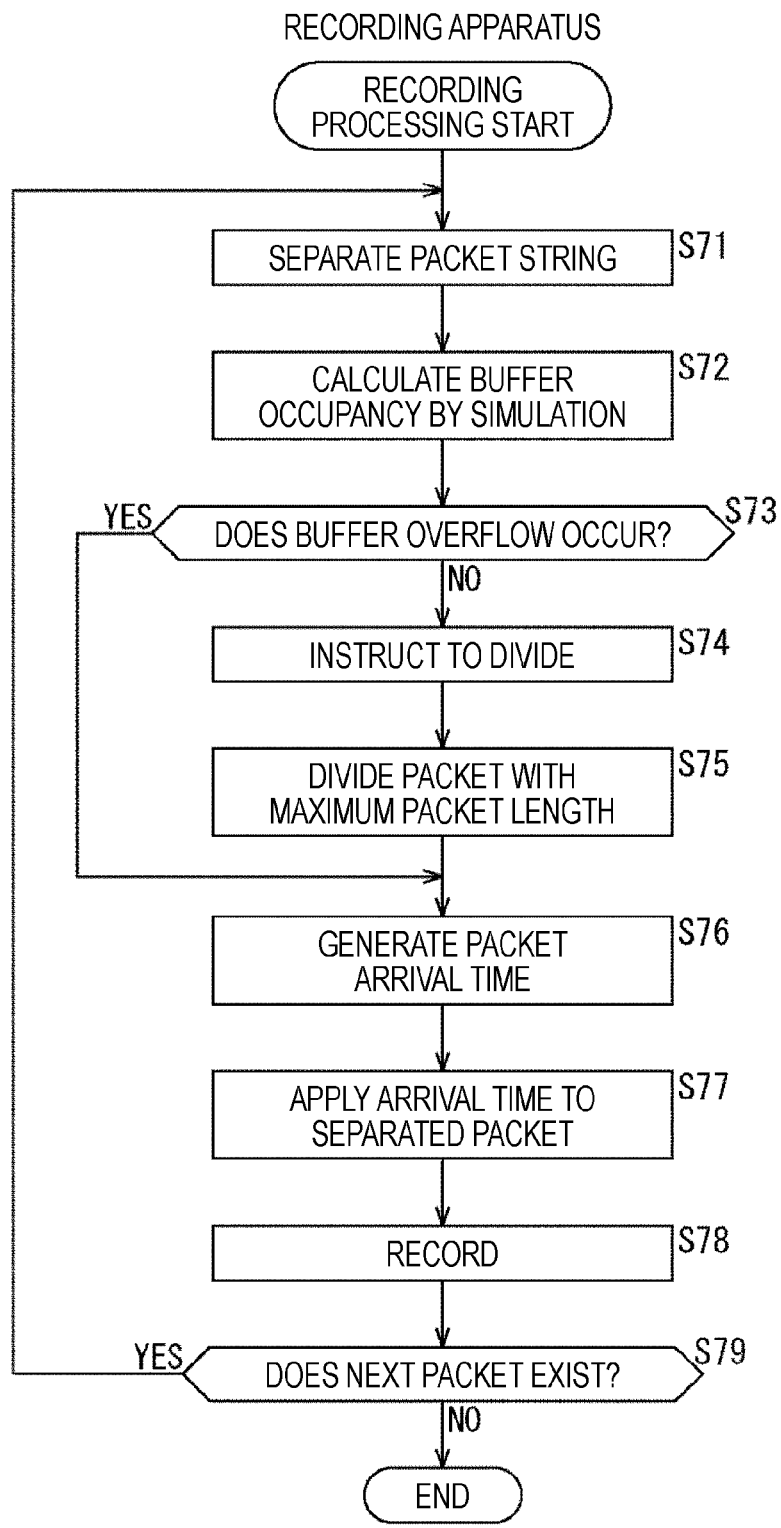
FIG. 11 is a flowchart describing recording processing by the recording apparatus in FIG. 10.

Note that, since processing in steps S71, S76 to S79 in FIG. 11 is similar to the processing in steps S51, S53 to S56 in FIG. 8, the description thereof is omitted.

That is, in step S72, the reading buffer simulating unit 121 sequentially performs processing of the decoder 76 by the packet string in packet units and simulates the buffer occupancy in the buffer 75 at that time.

In step S73, the reading buffer simulating unit 121 determines whether the buffer overflow occurs. In a case where the buffer overflow occurs, the procedure proceeds to step S74.

In step S74, the reading buffer simulating unit 121 reads the maximum packet length, corresponding to the maximum value of the buffer occupancy when the buffer overflow does not occur, from the simulation result and supplies the read maximum packet length to the packet dividing unit 122, and instructs the division of the packet.

In step S75, the packet dividing unit 122 divides the packet with the maximum packet length on the basis of the instruction from the reading buffer simulating unit 121 and supplies the divided packets to the packet arrival time applying unit 102.

On the other hand, in a case where the buffer overflow does not occur in step S73, the processing in steps S74 and S75 is skipped.

That is, when the packet string is sequentially decoded, the buffer occupancy at the time when the buffer 75 is actually used is simulated, and the packet which is anticipated to cause the buffer overflow is divided. In a case where the occurrence of the buffer overflow is not anticipated, the packet is not divided.

As a result, depending on whether the buffer overflow is anticipated, it is dynamically determined whether to divide the packet, and the packet is divided only when the buffer overflow occurs. Therefore, a load on unnecessary dividing processing can be reduced, and the buffer overflow can be surely avoided.

Furthermore, in a case where it is anticipated that buffer overflow occurs, the packet is divided with the maximum packet length corresponding to the maximum buffer occupancy at the time when the buffer overflow does not occur. Therefore, the dividing processing can be minimized, and the buffer overflow can be surely and efficiently avoided while reducing a processing load regarding the division.

Furthermore, in the above, an example of the recording apparatus and the reproducing apparatus has been described. However, for example, a configuration including a transmitting apparatus and a receiving apparatus may be used in which the transmitting apparatus performs processing of the recording apparatus and the receiving apparatus performs processing of the reproducing apparatus when a broadcast signal is transmitted.

<Example in Which Software Performs Processing>

The above-mentioned series of processing can be performed by hardware and software. In a case where the software performs the series of processing, a program included in the software is installed from a recording medium to a computer incorporated in a dedicated hardware or, for example, a general-purpose personal computer which can perform various functions by installing various programs.

Figure 12:
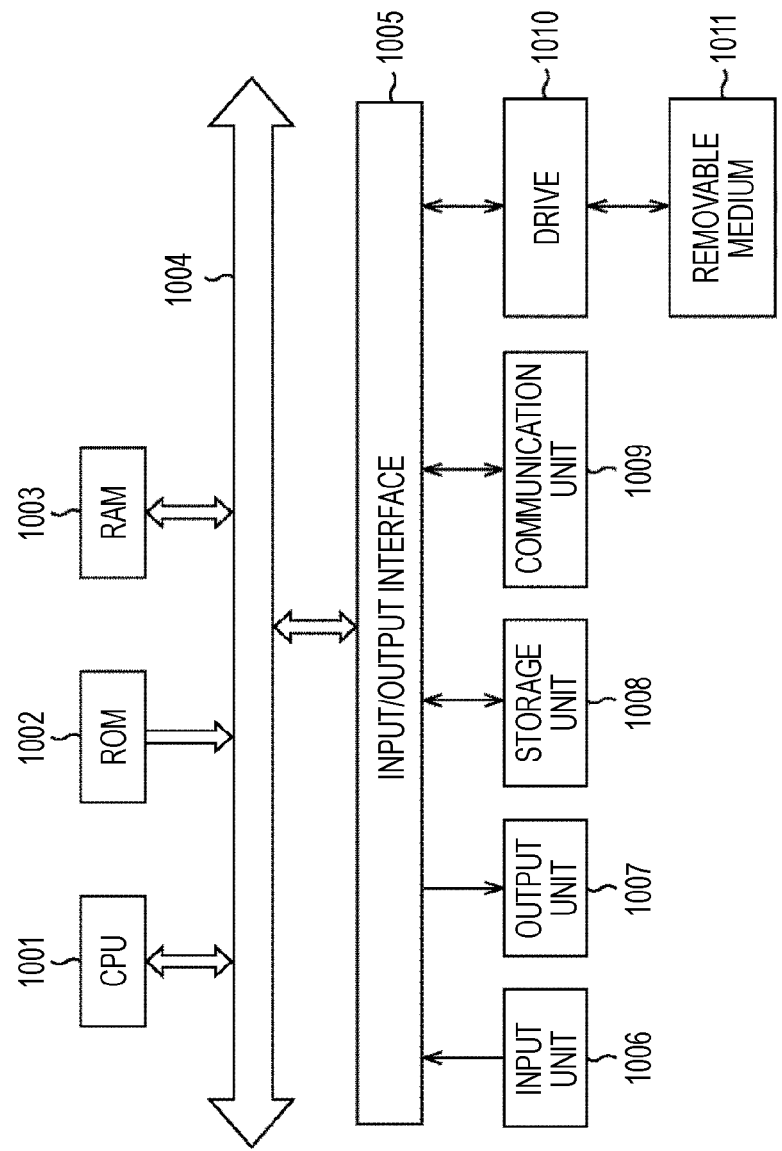
FIG. 12 is a diagram describing an exemplary configuration of a general-purpose personal computer.

FIG. 12 is an exemplary configuration of a general-purpose personal computer. The personal computer has a central processing unit (CPU) 1001 built therein. The CPU 1001 is connected to an input/output interface 1005 via a bus 1004. The bus 1004 is connected to a read only memory (ROM) 1002 and a random access memory (RAM) 1003.

The input/output interface 1005 is connected to an input unit 1006 including an input device such as a keyboard and a mouse by which a user inputs an operation command, an output unit 1007 for outputting images of a processing operation screen and a processing result to a display device, a storage unit 1008 including a hard disk drive or the like which stores a program and various data, and a communication unit 1009 including a local area network (LAN) adapter and the like and for performing communication processing through a network represented by the internet. Furthermore, the input/output interface 1005 is connected to a drive 1010 for reading/writing the data relative to a removable medium 1011 such as a magnetic disk (including a flexible disk), an optical disk (including a compact disc-read only memory (CD-ROM) and a digital versatile disc (DVD)), an optical magnetic disk (including a mini disc (MD)), or a semiconductor memory.

The CPU 1001 performs various processing according to programs. The program includes a program stored in the ROM 1002 or a program read from the removable medium 1011 such as the magnetic disk, the optical disk, the optical magnetic disk, or the semiconductor memory, installed to the storage unit 1008, and loaded from the storage unit 1008 to the RAM 1003. The RAM 1003 also appropriately stores data or the like necessary for the CPU 1001 to perform various processing.

In the computer configured as above, the CPU 1001 loads, for example, the program stored in the storage unit 1008 to the RAM 1003 via the input/output interface 1005 and the bus 1004 and executes the program so that the above-mentioned series of processing is performed.

The program performed by the computer (CPU 1001) can be recorded in the removable medium 1011, for example, as a package media and provided. Furthermore, the program can be provided via a wired or wireless transmission media such as a local area network, the internet, and digital satellite broadcasting.

In the computer, the program can be installed to the storage unit 1008 via the input/output interface 1005 by mounting the removable medium 1011 in the drive 1010. Furthermore, the program can be received by the communication unit 1009 via the wired or wireless transmission media and installed to the storage unit 1008. In addition, the program can be previously installed to the ROM 1002 and the storage unit 1008.

Note that, the program performed by the computer may be a program in which processing is performed along the order described herein in a time series manner and a program in which the processing is performed in parallel or at a necessary timing, for example, when a call has been performed.

Furthermore, a system means herein an assembly of a plurality of components (devices, modules (parts), and the like), and it is not considered whether all the components are in the same housing. Therefore, both of a plurality of devices respectively housed in different housings from each other and connected via the network and a single device having a plurality of modules housed in one housing are systems.

Furthermore, the embodiment of the present technology is not limited to the above-mentioned embodiments, and various changes can be made without departing from the scope of the present technology.

For example, the present technology may have a configuration of cloud computing in which a single function is separately performed by a plurality of devices via a network in cooperation.

Furthermore, each step described with reference to the above-mentioned flowchart can be performed by the single device and can be divided and performed by the plurality of devices.

In addition, in a case where a plurality of processing is included in one step, the plurality of processing included in one step can be performed by the single device and can be divided and performed by the plurality of devices.

Note that, the present technology may have a configuration below.

<1> A recording apparatus including:

a multiplexing/separating unit configured to separate each packet from a packet string;

a packet dividing unit configured to divide the packet into divided packets having a predetermined size;

a packet arrival time generating unit configured to generate a packet arrival time of each divided packet; and a packet arrival time applying unit configured to embed the packet arrival time generated by the time generating unit in a header of the divided packet.

<2> The recording apparatus according to <1>, further including:

a recording unit configured to record the divided packet in which the packet arrival time is embedded in the header to a recording medium, in which the predetermined size corresponds to a size of an additional buffer which is added to be a data buffer size same as that at the time of receiving, viewing, and listening by a reproducing apparatus, for reproducing the divided packet recorded to the recording medium, to avoid a buffer overflow.

<3> The recording apparatus according to <2>, in which when a reading maximum rate at the time when the reproducing apparatus reproduces the divided packet is Rp and a reading maximum rate at the time when the divided packet is recorded is Rr, the predetermined size is ((Rp/Rp−Rr)×(size of the buffer)).

<4> The recording apparatus according to any one of <1> to <3>, in which the multiplexing/separating unit separates each packet from the packet string and outputs information indicating an arrival timing of each packet, the packet arrival time generating unit generates the packet arrival time for each packet before the divided packet is divided on the basis of the information indicating the arrival timing of each packet, relative to a divided packet which is a head packet of the divided packets, the packet arrival time of the packet before the divided packet is divided is embedded in the header as it is, and relative to a second and subsequent divided packets from the head of the divided packets, a packet arrival time corresponding time sequentially calculated on the basis of the size of the divided packet and an input rate at the time of recording from the packet arrival time of the packet before the divided packet is divided is embedded in the header as the packet arrival time.

<5> The recording apparatus according to any one of <1> to <4>, in which the packet arrival time applying unit sets an extra header for each divided packet and embeds an arrival time stamp (ATS) in the extra header as the packet arrival time generated by the time generating unit.

<6> The recording apparatus according to any one of <1> to <5>, in which in a case of MPEG Media Transport (MMT), the packet arrival time applying unit embeds the packet arrival time generated by the time generating unit in a header including a MMTP packet header of each divided packet in a network time protocol (NTP) format.

<7> The recording apparatus according to any one of <1> to <6>, further including:

a simulating unit configured to simulate an operation of a reproducing apparatus which includes a buffer for sequentially buffering the divided packets recorded to the recording medium as necessary and a decoding unit for sequentially decoding a divided packet string buffered by the buffer and to instruct the buffer dividing unit to divide the packet into the divided packets in a case where a buffer overflow occurs in the simulation, in which the buffer dividing unit divides the packet into the divided packets only in a case where the simulating unit instructs to divide the packet into the divided packets.

<8> The recording apparatus according to <7>, in which the simulating unit instructs to divide the packet into the divided packets having the maximum packet length which does not cause the buffer overflow from the simulation result in a case where the buffer overflow occurs in the simulation, and the buffer dividing unit divides the packet into the divided packets having the maximum packet length which does not cause the buffer overflow.

<9> A recording method including:
separating each packet from a packet string;
dividing the packet into divided packets having a predetermined size;
generating a packet arrival time of each divided packet; and
embedding the generated packet arrival time in a header of the divided packet.

<10> A program for causing a computer to function as:
a multiplexing/separating unit configured to separate each packet from a packet string;
a packet dividing unit configured to divide the packet into divided packets having a predetermined size;
a packet arrival time generating unit configured to generate a packet arrival time of each divided packet; and
a packet arrival time applying unit configured to embed the packet arrival time generated by the time generating unit in a header of the divided packet.

REFERENCE SIGNS LIST 11 recording apparatus
31 multiplexing/separating unit
32 packet arrival time applying unit
33 PLL unit
34 recording unit
35 recording medium
61 reproducing apparatus
71 recording medium
72 packet reading unit
73 ATC counter
74 multiplexing/separating unit
75, 75-1 to 75-n buffer
76, 76-1 to 76-n decoder
77 display
101 packet dividing unit
102 packet arrival time applying unit
121 reading buffer simulating unit
122 packet dividing unit

The invention claimed is:

1. A recording apparatus comprising:
an electronic processor; and
a memory including a multiplexing/separating program, a packet dividing program, a packet arrival time generating program, and a packet arrival time applying program, the multiplexing/separating program, the packet dividing program, the packet arrival time generating program, and the packet arrival time applying program being executable by the electronic processor to perform a set of operations comprising
separating each packet from a packet string,
dividing a packet that is separated from the packet string into divided packets, each divided packet of the divided packets having a predetermined size,
generating a packet arrival time associated with the each divided packet, and
embedding the packet arrival times that are generated in corresponding headers of the divided packets,
wherein the memory further includes a recording program,
wherein the electronic processor is further configured to execute the recording program,
wherein the set of operations further includes recording the divided packets in which the packet arrival times are embedded in the corresponding headers to a recording medium,
wherein the predetermined size corresponds to a size of an additional buffer which is added to be a data buffer size same as that at the time of receiving, viewing, and listening by a reproducing apparatus, for reproducing the divided packets that are recorded to the recording medium, to avoid a buffer overflow,
wherein the predetermined size is (Rp/(Rp-Rr) x (size of the buffer)),
wherein a reading maximum rate at the time when the reproducing apparatus reproduces the each divided packet is the Rp, and
wherein a reading maximum rate at the time when the each divided packet is recorded is the Rr.

2. The recording apparatus according to claim 1, wherein the set of operations further includes
separating the each packet from the packet string and outputting information indicating an arrival time of the each packet, and
generating the packet arrival time of the packet before the packet is divided into the divided packets on a basis of the information indicating the arrival time of the packet,
wherein, relative to a head packet of the divided packets, the packet arrival time of the packet is embedded in a header of the head packet as the packet arrival time, and
wherein, relative to a second and subsequent divided packets from the head packet of the divided packets, a packet arrival time corresponding time sequentially and calculated on a basis of the predetermined size of the each divided packet and an input rate at the time of recording from the packet arrival time of the packet is embedded in corresponding headers of the second and the subsequent divided packets as the packet arrival time.

3. The recording apparatus according to claim 1, wherein the set of operations further includes
setting an extra header for the each divided packet, and
embedding an arrival time stamp (ATS) in the extra header as the packet arrival time.

4. The recording apparatus according to claim 1, wherein in a case of MPEG Media Transport (MMT), the corresponding headers are MMTP packet headers, and wherein the packet arrival times are in a network time protocol (NTP) format.

5. The recording apparatus according to claim 1, wherein the memory further includes a simulating program,
wherein the electronic processor is further configured to execute the simulating program, and
wherein the set of operations further includes
simulating an operation of a reproducing apparatus which includes a buffer for sequentially buffering the divided packets recorded to a recording medium as necessary and a decoder for sequentially decoding a divided packet string buffered by the buffer, and
dividing the packet into the divided packets in a case where a buffer overflow occurs in the simulation.

6. The recording apparatus according to claim 5, wherein the set of operations further includes
determining a maximum packet length of the each divided packet that does not cause the buffer overflow from a simulation result in the case where the buffer overflow occurs in the simulation, and
dividing the packet into the divided packets having the maximum packet length.

7. A recording method comprising:
separating, with an electronic processor, each packet from a packet string;

dividing, with the electronic processor, a packet that is separated from the packet string into divided packets, each divided packet of the divided packets having a predetermined size;
generating, with the electronic processor, a packet arrival time associated with the each divided packet;
embedding, with the electronic processor, the packet arrival times that are generated in corresponding headers of the divided packets; and
controlling, with the electronic processor, a recording medium to record the divided packets in which the packet arrival times are embedded in the corresponding headers,
wherein the predetermined size corresponds to a size of an additional buffer which is added to be a data buffer size same as that at the time of receiving, viewing, and listening by a reproducing apparatus, for reproducing the divided packets that are recorded to the recording medium, to avoid a buffer overflow,
wherein the predetermined size is (Rp/(Rp-Rr) x (size of the buffer)),
wherein a reading maximum rate at the time when the reproducing apparatus reproduces the each divided packet is the Rp, and
wherein a reading maximum rate at the time when the each divided packet is recorded is the Rr.

8. The recording method according to claim 7, further comprising:
separating, with the electronic processor, the each packet from the packet string and outputting information indicating an arrival time of the each packet; and
generating, with the electronic processor, the packet arrival time of the packet before the packet is divided into the divided packets on the basis of the information indicating the arrival time of the packet,
relative to a head packet of the divided packets, the packet arrival time of the packet is embedded in a header of the head packet as the packet arrival time, and
relative to a second and subsequent divided packets from the head packet of the divided packets, a packet arrival time corresponding time sequentially and calculated on a basis of the predetermined size of the each divided packet and an input rate at the time of recording from the packet arrival time of the packet is embedded in corresponding headers of the second and the subsequent divided packets as the packet arrival time.

9. The recording method according to claim 7, further comprising
setting, with the electronic processor, an extra header for the each divided packet; and
embedding, with the electronic processor, an arrival time stamp (ATS) in the extra header as the packet arrival time.

10. The recording method according to claim 7, wherein, in a case of MPEG Media Transport (MMT), the corresponding headers are MMTP packet headers, and the packet arrival times are in a network time protocol (NTP) format.

11. A non-transitory computer-readable medium comprising a program that, when executed by an electronic processor, causes the electronic processor to perform a set of operations, the set of operations comprising:

separating each packet from a packet string;
dividing a packet that is separated from the packet string into divided packets, each divided packet of the divided packets having a predetermined size;
generating a packet arrival time associated with the each divided packet; and
embedding the packet arrival times that are generated in corresponding headers of the divided packets,
wherein the set of operations further includes controlling a recording medium to record the divided packets in which the packet arrival times are embedded in the corresponding headers,
wherein the predetermined size corresponds to a size of an additional buffer which is added to be a data buffer size same as that at the time of receiving, viewing, and listening by a reproducing apparatus, for reproducing the divided packets that are recorded to the recording medium, to avoid a buffer overflow,
wherein the predetermined size is (Rp/(Rp-Rr) x (size of the buffer)),
wherein a reading maximum rate at the time when the reproducing apparatus reproduces the each divided packet is the Rp, and
wherein a reading maximum rate at the time when the each divided packet is recorded is the Rr.

12. The non-transitory computer-readable medium according to claim 11, wherein the set of operations further includes
separating the each packet from the packet string and outputting information indicating an arrival time of the each packet; and
generating the packet arrival time of the packet before the packet is divided into the divided packets on a basis of the information indicating the arrival time of the packet,
wherein, relative to a head packet of the divided packets, the packet arrival time of the packet is embedded in a header of the head packet as the packet arrival time, and
wherein, relative to a second and subsequent divided packets from the head packet of the divided packets, a packet arrival time corresponding time sequentially and calculated on a basis of the predetermined size of the each divided packet and an input rate at the time of recording from the packet arrival time of the packet is embedded in corresponding headers of the second and the subsequent divided packets as the packet arrival time.

13. The non-transitory computer-readable medium according to claim 11, wherein the set of operations further includes
setting an extra header for the each divided packet; and
embedding an arrival time stamp (ATS) in the extra header as the packet arrival time.

14. The non-transitory computer-readable medium according to claim 11, wherein in a case of MPEG Media Transport (MMT),the corresponding headers are MMTP packet headers, and the packet arrive times are in a network time protocol (NTP) format.

* * * * *